US008528974B2

(12) United States Patent
Nihonmatsu et al.

(10) Patent No.: US 8,528,974 B2
(45) Date of Patent: Sep. 10, 2013

(54) SEAT SLIDE APPARATUS FOR VEHICLE

(75) Inventors: Hideo Nihonmatsu, Anjo (JP);
Ryousuke Mizuno, Novi, MI (US);
Genta Moriyama, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 215 days.

(21) Appl. No.: 13/116,373

(22) Filed: May 26, 2011

(65) Prior Publication Data
US 2012/0032058 A1    Feb. 9, 2012

(30) Foreign Application Priority Data

Aug. 3, 2010   (JP) ................................. 2010-174598

(51) Int. Cl.
*A47C 1/00*   (2006.01)
*A61G 15/00*   (2006.01)
*B60N 2/00*   (2006.01)
*B60N 2/02*   (2006.01)

(52) U.S. Cl.
USPC ........ 297/341; 297/344.1; 248/429; 248/430; 248/419

(58) Field of Classification Search
USPC ................. 248/429, 430, 419, 423; 297/341, 297/344.1, 317
See application file for complete search history.

(56) References Cited

U.S. PATENT DOCUMENTS

| | | | |
|---|---|---|---|
| 5,052,751 A * | 10/1991 | Hayakawa et al. | 297/341 |
| 5,605,377 A * | 2/1997 | Tame | 297/341 |
| 6,227,596 B1 | 5/2001 | Foucault et al. | |
| 6,341,819 B1 * | 1/2002 | Kojima et al. | 297/341 |
| 6,474,739 B1 | 11/2002 | Lagerweij | |
| 2004/0113477 A1 | 6/2004 | Kojima | |

FOREIGN PATENT DOCUMENTS

JP    11-321393    11/1999
WO    WO 02/40309 A2    5/2002

OTHER PUBLICATIONS

Extended European Search Report issued on Nov. 3, 2011, in Patent Application No. 11166473.6.

* cited by examiner

*Primary Examiner* — Amy J. Sterling
(74) *Attorney, Agent, or Firm* — Oblon, Spivak, McClelland, Maier & Neustadt, L.L.P.

(57) ABSTRACT

A seat slide apparatus for a vehicle includes first and second lower rails, first and second upper rails, first and second lock levers, first and second biasing members, first and second support brackets fixed to the first and second upper rails and including first and second support portions, an operation handle including first and second power transmission portions pressing the first and second lock levers so as to release the restriction of the movement of the upper rails relative to the lower rails against a biasing force of the biasing members, and a release lever rotatably connected to the first upper rail and rotating in association with a forward folding of a seat back of the seat to release the restriction of the movement of the upper rails relative to the lower rails by directly pressing the first power transmission portion.

3 Claims, 3 Drawing Sheets

SEAT SLIDE APPARATUS FOR VEHICLE

CROSS REFERENCE TO RELATED APPLICATIONS

This application is based on and claims priority under 35 U.S.C. §119 to Japanese Patent Application 2010-174598, filed on Aug. 3, 2010, the entire content of which is incorporated herein by reference.

TECHNICAL FIELD

This disclosure relates to a seat slide apparatus for a vehicle.

BACKGROUND DISCUSSION

A known seat slide apparatus for a vehicle is disclosed in JPH11-321393A (which will be hereinafter referred to as Reference 1). The seat slide apparatus disclosed in Reference 1 includes a pair of slide rails parallel to each other in a width direction of a seat for the vehicle and a pair of stoppers provided at the pair of slide rails. Each of the slide rails includes an upper rail and a lower rail. Each of the stoppers is generally in a locked state so as to prevent a movement of the upper rail relative to the lower rail. The locked state of the stopper is released at the same time as when a control bar substantially having a U-shape is pulled upwardly so that an operation force thereof is transmitted to the stopper. Accordingly, a position of the seat is adjustable relative to a floor of the vehicle (i.e., a vehicle floor). The control bar is connected via both end portions thereof to the respective stoppers.

In addition, according to the aforementioned seat slide apparatus disclosed in Reference 1, a slider provided at one of the slide rails (i.e., a first slide rail) moves rearward by an exterior cable that is pulled in association with a forward folding of a seatback of the seat. As a result, the locked state of the stopper provided at the first slide rail is released. Further, a link rotating in association with the rearward movement of the slider is supported at the first slide rail. One end of a connection bar that extends in the width direction of the seat is integrally fixed to the link. The other end of the connection bar is integrally fixed to a lever rotatably supported by the other of the slide rails (i.e., a second slide rail). Because of the rotation of the connection bar via the link in association with the rearward movement of the slider, the lever releases the locked state of the stopper provided at the second slide rail. Accordingly, the locked states of both the stoppers provided at the first and second slide rails respectively are released at the same time in association with the forward folding of the seatback of the seat, thereby achieving the movement of the seat to a foremost position relative to the vehicle floor.

According to the seat slide apparatus disclosed in Reference 1, the connection bar and a surrounding structure thereof may be necessary so as to move both the stoppers at the same time in association with the forward folding of the seat back, which may lead to an increase of the number of components.

A need thus exists for a seat slide apparatus for a vehicle which is not susceptible to the drawback mentioned above.

SUMMARY

According to an aspect of this disclosure, a seat slide apparatus for a vehicle includes first and second lower rails arranged at both sides in a width direction of a seat and extending in a longitudinal direction of the seat, first and second upper rails fixed to the seat and movably connected to the first and second lower rails respectively in the longitudinal direction, first and second lock levers rotatably connected to the first and second upper rails respectively, the first and second lock levers engaging with the first and second lower rails respectively to selectively restrict a movement of the first and second upper rails relative to the first and second lower rails, first and second biasing members biasing the first and second lock levers respectively in such a manner that the movement of the first and second upper rails relative to the first and second lower rails is restricted, first and second support brackets fixed to the first and second upper rails and including first and second support portions respectively, an operation handle integrally including an operating portion that extends in the width direction and first and second power transmission portions extending in the longitudinal direction from both ends of the operating portion to be supported by the first and second support portions, the first and second power transmission portions pressing the first and second lock levers respectively in association with rotations of the first and second power transmission portions relative to the first and second support portions so as to release the restriction of the movement of the first and second upper rails relative to the first and second lower rails by the first and second lock levers against a biasing force of the first and second biasing members, and a release lever rotatably connected to the first upper rail and rotating in association with a forward folding of a seat back of the seat so as to release the restriction of the movement of the first and second upper rails relative to the first and second lower rails by the first and second lock levers by directly pressing the first power transmission portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 4:
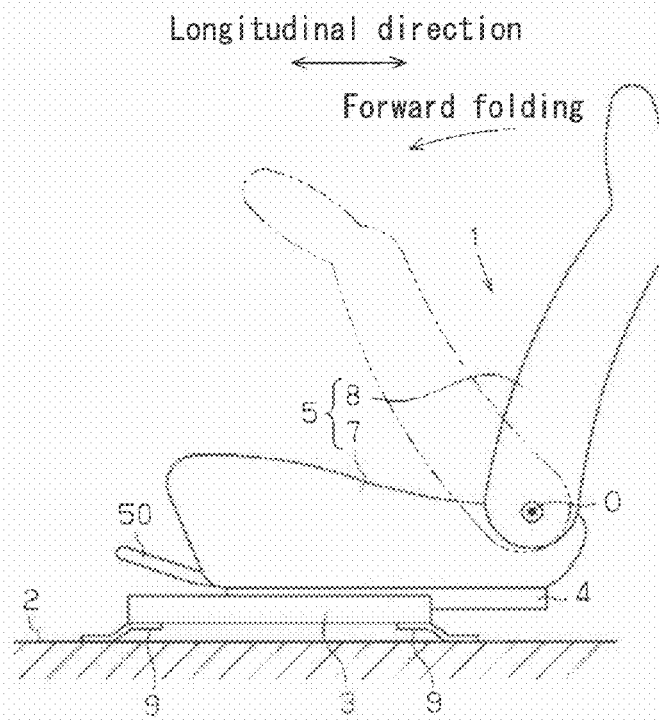
FIG. 4 is a side view illustrating a seat apparatus at which the seat slide apparatus according to the embodiment is mounted.

An embodiment will be explained with reference to the attached drawings. FIG. 4 schematically illustrates a seat apparatus for a vehicle (hereinafter simply referred to as a seat apparatus) 1 provided at a front-seat side of the vehicle such as an automobile. In the embodiment, directions and orientations such as left, right, front, rear, top, and bottom correspond to those when viewed from a passenger seated on the seat apparatus 1. As illustrated in FIG. 4, a lower rail 3 that extends in a longitudinal direction of the vehicle is fixed to a floor of the vehicle (hereinafter referred to as a floor) 2 via a pair of leg brackets 9. In addition, an upper rail 4 is mounted on the lower rail 3 so as to be movable relative thereto.

According to the present embodiment, the lower rail 3 and the upper rail 4 serving as a first lower rail and a first upper rail are provided at a first side (for example, a left side) of the seat apparatus 1 in a width direction of the vehicle while another lower rail 3 and another upper rail 4 serving as a second lower rail and a second upper rail are provided at a second side (for example, a right side) of the seat apparatus 1 in the width direction. In FIG. 4, only the lower rail 3 and the upper rail 4 provided at the first side (i.e., the left side) of the seat apparatus 1 are illustrated. A seat 5 forming a seating portion for an occupant is fixed to and supported by the two upper rails 4. The seat 5 includes a seat cushion 7 forming a seating portion and a seat back 8 supported by a rear edge portion of the seat cushion 7 so as to be rotatable or tiltable about a rotational axis O. A relative movement between each of the lower rails 3 and each of the upper rails 4 is basically restricted. Thus, an operation handle 50 is provided to release the restricted state of the movement between the lower rail 3 and the upper rail 4.

Figure 1:
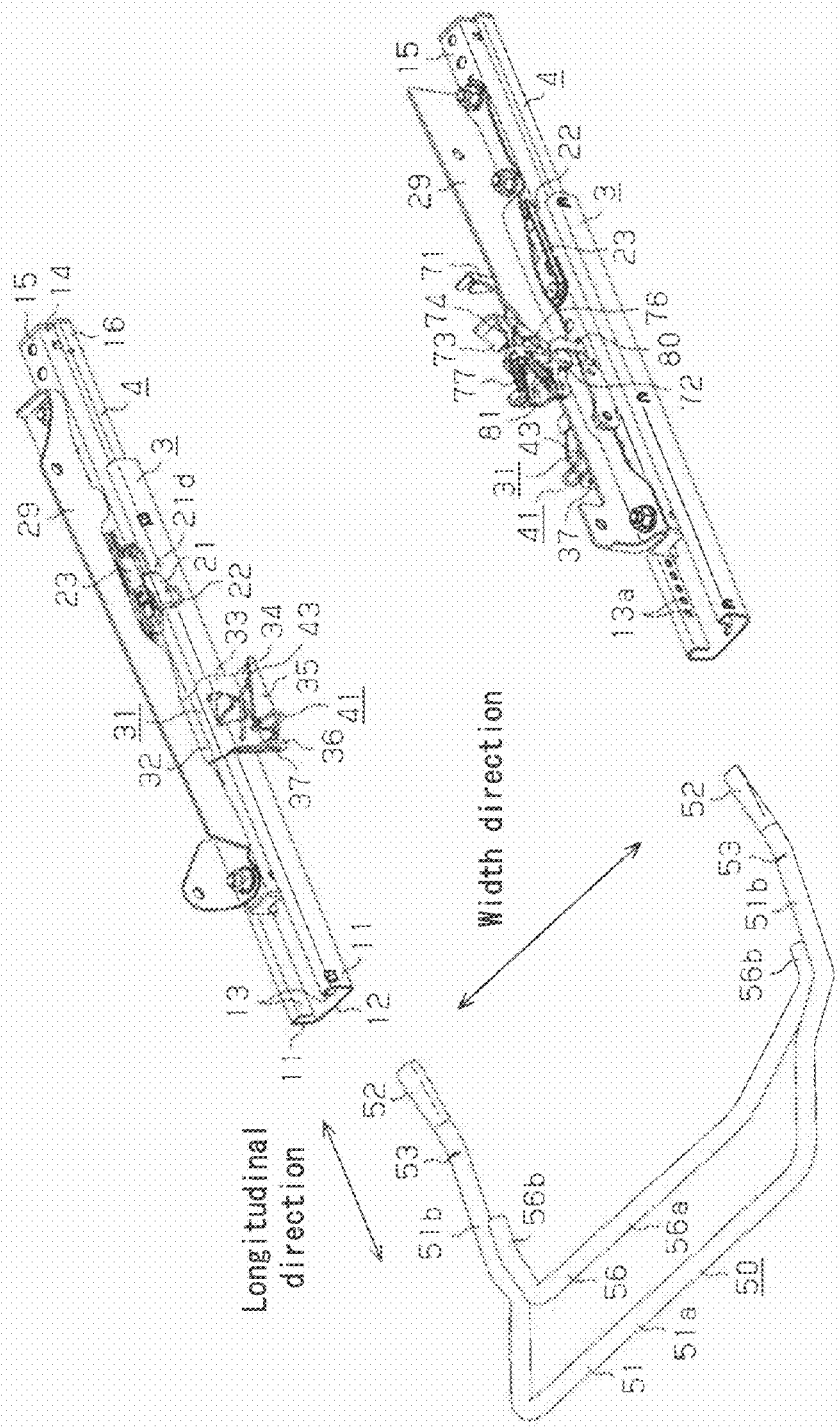
FIG. 1 is an exploded perspective view illustrating a seat slide apparatus according to an embodiment disclosed here.
Figure 2A:
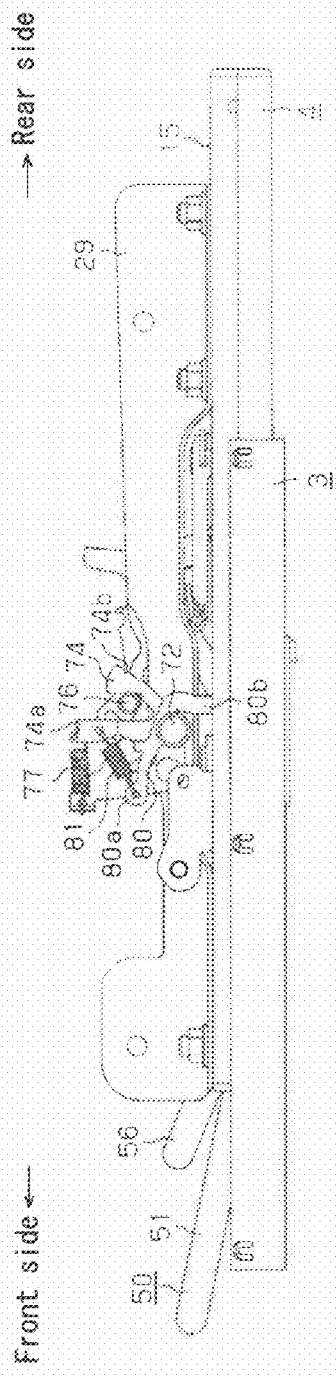
FIGS. 2A and 2B are side views each illustrating a lower rail, an upper rail, and a peripheral structure provided at one side of the seat slide apparatus according to the embodiment.
Figure 2B:
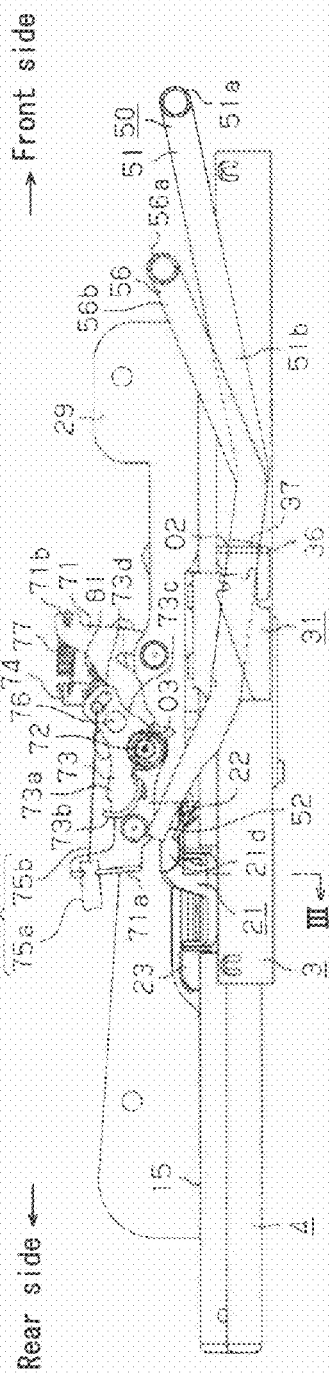
Figure 3:
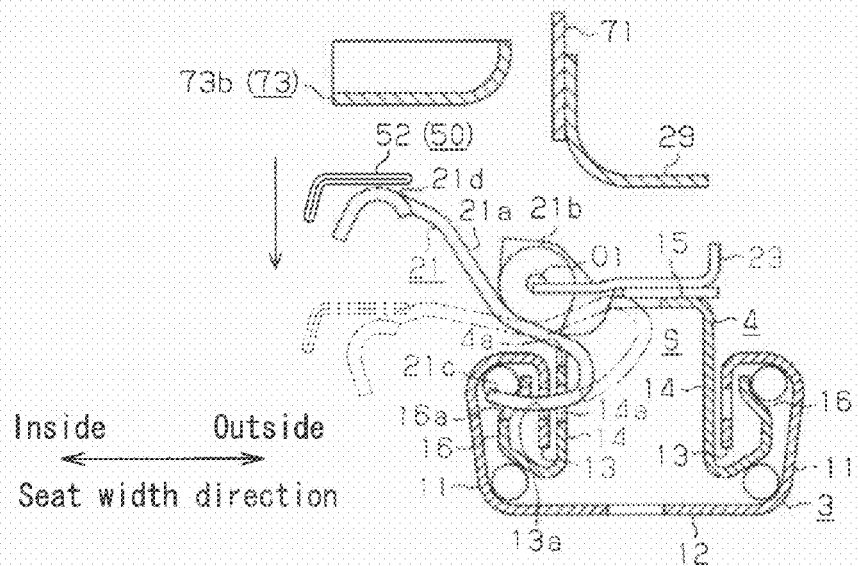
FIG. 3 is a cross-sectional view taken along the line illustrated in FIG. 2B.

Next, a seat slide apparatus according to the present embodiment will be explained with reference to FIGS. 1 to 3. FIG. 1 is a perspective view illustrating the seat slide apparatus of the present embodiment. FIG. 2A is a side view of the lower rail 3, the upper rail 4, and a peripheral structure provided at one side (specifically, at the first side) of the seat slide apparatus when viewed from an exterior side in the width direction. FIG. 2B is a side view of the lower rail 3, the upper rail 4, and the peripheral structure provided at the first side of the seat slide apparatus when viewed from an interior side in the width direction. FIG. 3 is a cross-sectional view taken along the line III-III illustrated in FIG. 2B.

As illustrated in FIG. 3, each of the lower rails 3 includes a pair of side wall portions 11 separating from one another in the width direction and extending in a vertical direction, and a bottom wall portion 12 connecting lower end portions (i.e., base portions) of the side wall portions 11. Folding wall portions 13 are continuously formed at upper end portions (i.e., end portions) of the side wall portions 11 respectively so as to extend inwardly in the width direction of the lower rail 3 and then to fold downwardly towards the base portions of the side wall portions 11.

Each of the upper rails 4 includes a pair of side wall portions 14 extending in the vertical direction between the folding wall portions 13 of the lower rail 3, and a cover wall portion 15 connecting upper end portions (i.e., base portions) of the side wall portions 14. Folding wall portions 16 are continuously formed at lower end portions (i.e., end portions) of the side wall portions 14 so as to extend outwardly in the width direction of the upper rail 4 and then folding upwardly in such a manner that each of the folding wall portions 16 is positioned between the side wall portion 11 and the folding wall portion 13.

Each of the lower rails 3 and each of the upper rails 4 form an inner void S therebetween in cross sections. Multiple lock bores 13a are formed at one of the folding wall portions 13 inwardly positioned in the width direction of the seat 5 (i.e., a left side in FIG. 3) (which will be hereinafter referred to as the inward folding wall portion 13) over a substantially entire length of the folding wall portion 13. The lock bores 13a are formed side by side at predetermined intervals in the longitudinal direction of the inward folding wall portion 13. A through-hole 4a is formed at a substantially center portion of each of the upper rails 4 in the longitudinal direction. The through-hole 4a is formed by a cutting of a corner portion defined by the cover wall portion 15 and the side wall portion 14 positioned inwardly in the width direction of the seat 5 (which will be hereinafter referred to as the inward side wall portion 14). Multiple insertion bores 14a are formed side by side at the predetermined intervals at a lower portion of the inward side wall portion 14. Specifically, the insertion bores 14a are provided within a range where the through-hole 4a is formed in the longitudinal direction. Multiple insertion holes 16a, of which the number is the same as the number of insertion bores 14a, are formed side by side at the predetermined intervals at the folding wall portion 16 that is continuously connected to the inward side wall portion 14. The insertion bores 14a and the insertion holes 16a are arranged so as to face one another in the width direction and are positioned so as to match a portion of the lock bores 13a of the lower rail 3 of which the number is the same as the number of the insertion bores 14a or the insertion holes 16a.

A lock lever 21 made of a plate member is rotatably connected via a bracket 23 to each of the upper rails 4 within the range of the through-hole 4a in the longitudinal direction. The lock lever 21 includes a body portion 21a having a flat plate shape and a pair of support pieces 21b. The support pieces 21b are bent to extend upwardly from respective lower ends of the body portion 21a in the longitudinal direction of the upper rail 4. The lock lever 21 is supported via the support pieces 21b at an outer side of the inner void S so as to be rotatable about a rotational axis O1 that extends in the longitudinal direction of the upper rail 4. The lock lever 21 also includes multiple lock claws 21c that extend towards the inner void S through the through-hole 4a and that are bent back to the outside (i.e., the left side in FIG. 3) of the inner void S. The lock claws 21c are formed at the predetermined intervals in the longitudinal direction while the number of lock claws 21c is the same as the number of the insertion bores 14a or the insertion holes 16a. The lock claws 21c are arranged in such a manner to be engageable and disengageable relative to the insertion bores 14a and the insertion holes 16a while the lock lever 21 is rotating about the rotational axis O1.

In a case where the lock claws 21c are inserted into the corresponding lock bores 13a in addition to the insertion bores 14a and the insertion holes 16a, the relative movement between the lower rail 3 and the upper rail 4 is restricted. On the other hand, in a case where the lock claws 21c disengage from the corresponding insertion holes 16a, the lock bores 13a, and the insertion bores 14a sequentially, the restricted state of the relative movement between the lower rail 3 and the upper rail 4 is released (i.e., the relative movement between the lower rail 3 and the upper rail 4 is permitted.

Further, the lock lever 21 includes a contact portion 21d that inclines downwardly from an upper portion of the body portion 21a. As illustrated in FIG. 1, a torsion wire 22 is provided at an upper portion of each of the upper rails 4. That is, two of the torsion wires 22 serving as first and second biasing members are provided at the upper rails 4 at the first side and the second side respectively. One end of each of the torsion wires 22 engages with the lock lever 21 while the other end of the torsion wire 22 engages with the bracket 23. Each of the lock levers 21 is constantly biased by the torsion wire 22 so as to rotate in a direction where the lock claws 21c are inserted into the insertion bores 14a, the insertion holes 16a, and the lock bores 13a (i.e., the lock lever 21 is biased to rotate in a clockwise direction in FIG. 3).

A support bracket 31 formed by a plate member is fixed to each of the upper rails 4. The support bracket 31 is arranged at a front side of the lock lever 21 in the longitudinal direction. The support bracket 31 includes a fitting wall portion 32 and a first side wall portion 33. The fitting wall portion 32 extends in the width direction of the upper rail 4 so as to be tightened to the cover wall portion 15 thereof. The first side wall portion 33 extends downwardly from an end of the fitting wall portion 32 so as to surround the side wall portion 11 of the lower rail 3 inwardly positioned in the width direction. The support bracket 31 also includes a bottom wall portion 34, a second side wall portion 35, and a support wall portion 36. The bottom wall portion 34 extends inwardly in the width direction of the seat 5 from a lower end of the first side wall portion 33. The second side wall portion 35 extends upwardly from an end of the bottom wall portion 34 while having a triangular shape. The support wall portion 36 extends from a front end of the first side wall portion 33 inwardly in the width direction of the seat 5. A support bore 37 having a rectangular shape is formed at the support wall portion 36 so as to open in the longitudinal direction of the upper rail 4.

A torsion spring 41 formed by a single wire rod is attached to each of the support brackets 31. One end of the torsion spring 41 engages with the first side wall portion 33 while the other end of the torsion spring 41 engages with the second side wall portion 35. An extension portion 43 is formed between the both ends of the torsion spring 41 so as to have a U-shape. A downward biasing force is generated at the extension portion 43 relative to the both ends of the torsion spring 41.

An operation handle 50 is connected to both the support brackets 31 serving as first and second support brackets. The operation handle 50 includes a handle body portion 51 formed by a cylindrical member that is bent. The handle body portion 51 integrally includes an operating portion 51a and end portions 51b serving as first and second power transmission portions so as to substantially form into a loop shape. The operating portion 51a extends in the width direction of the seat 5 at a front side of the lower rails 3, and the like. The end portions 51b are bent from both ends of the operating portion 51a towards the respective lock levers 21 serving as first and second lock levers in the longitudinal direction of the upper rails 4. The handle body portion 51 also includes pressing portions 52 each serving as an edge portion and each formed by being pressed in the vertical direction into a flat plate shape. The handle body portion 51 further includes holding grooves 53 each having a slit shape. Specifically, each of the holding grooves 53 is formed at a portion in the vicinity of each of the pressing portions 52, i.e., at a side facing the operating portion 51a. The holding groove 53 is formed so that an upper portion thereof is cut out in the width direction of the seat 5.

The handle body portion 51 is supported by the support wall portions 36 in such a manner that the end portions 51b are inserted into the support bores 37, serving as first and second support portions and first and second support bores, of the support wall portions 36 respectively in the longitudinal direction of the upper rails 4. In addition, the handle body portion 51 is connected to the lock levers 21 in such a manner that the pressing portions 52 are placed on the contact portions 21d of the lock levers 21 respectively as illustrated in FIG. 3. At this time, the extension portions 43 of the torsion springs 41 are fitted to the respective holding grooves 53 so that the end portions 51b of the handle body portion 51 engage with the support brackets 31 and thus the end portions 51b are restrained from disengaging from the support brackets 31 in a state where upper portions of the end portions 51b are biased downwardly at the holding grooves 53.

As illustrated in FIG. 2B, a contact portion of each of the support wall portions 36 (specifically, each of the support bores 37) relative to an upper portion of each of the end portions 51b of the handle body portion 51 serves as a rotation reference point at which the handle body portion 51 rotates. Thus, each of the support wall portions 36 supports the handle body portion 51 to be rotatable at a rotational axis O2 specified at the contact portion between the support wall portion 36 and the upper portion of the end portion 51b. The rotation reference point of the handle body portion 51 is defined by the support bracket 31 (the support wall portion 36) because of a usage of principle of leverage, thereby balancing an operation force of the handle body portion 51 for releasing the locked state of the lock lever 21. The rotation direction of the handle body portion 51 rotating at the rotational axis O2 is different from the rotation direction of the lock lever 21 rotating at the rotational axis O1. The torsion springs 41 elastically hold the handle body portion 51 at a predetermined initial position so as to maintain the connected state between the handle body portion 51 and the lock levers 21.

As illustrated in FIG. 1, the operation handle 50 includes a reinforcement portion 56 obtained by a cylindrical member that is bent. The reinforcement portion 56 integrally includes a connecting portion 56a and a pair of fixing portions 56b serving as first and second fixing portions. The connecting portion 56a extends in the width direction of the seat 5 at a rear side of the operating portion 51a. The fixing portions 56b are bent from both ends of the connecting portion 56a towards the respective lock levers 21 in the longitudinal direction of the upper rails 4. The fixing portions 56b of the reinforcement portion 56 are fixed to respective inner side surfaces of the end portions 51b in the width direction of the seat 5 by welding, or the like. As illustrated in FIG. 2B, in a case where each of the end portions 51b of the handle body portion 51 is rotatably supported by each of the support bores 37, an end surface of the fixing portion 56b is in contact with a front end portion of the support bore 37 (i.e., an end portion facing the operating portion 51a in the longitudinal direction of the seat 5). Each of the fixing portions 56b is fixed to each of the end portions 51b at a contact position relative to the front end portion of each of the support bores 37. The aforementioned contact position is the closest to a position where each of the pressing portions 52 of the end portion 51b presses the upper surface of each of the lock levers 21 within a range close to the operating portion 51a relative to the support bore 37 in the longitudinal direction of the seat 5 where an arrangement restriction may not be generally affected.

As illustrated in FIG. 1, a supporting bracket 29 is tightened to an upper surface of the cover wall portion 15 of each of the upper rails 4. That is, two of the supporting brackets 29 serving as first and second supporting brackets are provided at the upper rails 4 at the first side and the second side respectively. The supporting bracket 29 is formed by a plate member that is bent in an L-shape so as to extend upwardly at the inner side in the width direction of the seat 5. A bottom wall portion of the supporting bracket 29 has a concave-convex surface so as to avoid an interference with the lock lever 21 and the support bracket 31. An auxiliary bracket 71 having a plate shape is tightened to a substantially intermediate portion of one of the supporting brackets 29 (i.e., the supporting bracket 29 shown in a lower right side in FIG. 1, i.e., the supporting bracket 29 at the first side). As illustrated in FIG. 2B, the auxiliary bracket 71 includes a cable support portion 71a having a flange shape and a spring support portion 71b having a flange shape. The cable support portion 71a extends inwardly in the width direction of the seat 5 from a rear edge of the auxiliary bracket 71. The spring support portion 71b extends inwardly in the width direction of the seat 5 from a front edge of the auxiliary bracket 71.

A support pin 72 penetrates in the width direction of the seat 5 through the supporting bracket 29 and an intermediate portion of the auxiliary bracket 71 in the longitudinal direction of the seat 5 between the support wall portion 36 and the pressing portion 52. The support pin 72 is provided at an upper side of the pressing portion 52. Then, a release lever 73, a power transmission lever 74, and a memory lever 80, each having a plate shape, are rotatably supported by the support pin 72. The release lever 73 is provided at the inner side in the width direction of the seat 5 relative to the auxiliary bracket 71, and the like while the power transmission lever 74 and the memory lever 80 are provided at the outer side in the width direction of the seat 5 relative to the auxiliary bracket 71, and the like. The release lever 73, the power transmission lever 74, and the memory lever 80 possess a common rotational center, i.e., a rotational center O3 that extends in the width direction of the seat 5. The release lever 73, the power transmission lever 74, the memory lever 80, and the auxiliary bracket 71 are only provided at the upper rail 4 at the first side according to the present embodiment.

The release lever 73 includes a first extending portion 73a and a pressing piece 73b having a flange shape. The first extending portion 73a extends radially relative to the rotational center O3 to a rear side thereof. The pressing piece 73b extends inwardly in the width direction of the seat 5 from a lower rear edge of the first extending portion 73a. The pressing piece 73b is arranged above the pressing portion 52 while being positioned on a rotation locus relative to the rotational center O3. Accordingly, in a case where the release lever 73 rotates in a counterclockwise direction in FIG. 2B about the support pin 72, the pressing piece 73b directly presses the upper surface of the pressing portion 52. The rotational center O3 of the release lever 73 is positioned at an intermediate portion in the longitudinal direction of the seat 5 between the support bore 37 and a position where the pressing piece 73b of the release lever 73 presses the upper surface of the pressing portion 52. As a result, when the release lever 73 rotates while pressing the pressing portion 52, the position where the pressing piece 73b of the release lever 73 presses the upper surface of the pressing portion 52 is displaced towards the support bore 37.

The release lever 73 also includes a second extending portion 73c and an engagement bore 73d. The second extending portion 73c extends radially relative to the rotational center O3 to a front upper side thereof. The engagement bore 73d is formed at a front end of the second extending portion 73c. An end portion of an inner wire 75b pulled from an external cable portion 75a of a release cable 75 that is held by the cable support portion 71a engages with the engagement bore 73d. The release cable 75 is connected to the seat back 8 and is configured in such a manner that the inner wire 75b is pulled within the external cable portion 75a in association with the forward folding of the seat back 8. At this time, the release lever 73 rotates about the support pin 72 in a counterclockwise direction in FIG. 2B. A power transmission pin 76 is fixed to the second extending portion 73c so as to extend externally in the width direction of the seat 5. Specifically, the power transmission pin 76 is arranged at an intermediate portion in the longitudinal direction of the seat 5 between the rotational center O3 and the engagement bore 73d of the release lever 73.

The power transmission lever 74 includes a spring support piece 74a and an engagement piece 74b to thereby substantially form into a V-shape. The spring support piece 74a and the engagement piece 74b radially extend relative to the rotational center O3 to an upper side and an upper rear side respectively. The power transmission pin 76 is inserted into a portion between the spring support piece 74a and the engagement piece 74b. Therefore, in a case where the release lever 73 rotates about the support pin 72 in the clockwise direction in FIG. 2A, the engagement piece 74b of the power transmission lever 74 is pressed by the power transmission pin 76 so that the release lever 73 and the power transmission lever 74 integrally rotate. On the other hand, in a case where the power transmission lever 74 rotates about the support pin 72 in the counterclockwise direction in FIG. 2A, the power transmission pin 76 is pressed by the engagement piece 74b so that the power transmission lever 74 and the release lever 73 integrally rotate.

A return spring 77 is disposed between the auxiliary bracket 71 and the power transmission lever 74. Specifically, one end of the return spring 77 engages with the spring support portion 71b of the auxiliary bracket 71 while the other end of the return spring 77 engages with the spring support piece 74a of the power transmission lever 74. The return spring 77 generates a biasing force in a direction where the release lever 73 rotates in the clockwise direction in FIG. 2B via the power transmission lever 74 and the power transmission pin 76, i.e., in a direction where the inner wire 75b is pulled out from the external cable portion 75a. Accordingly, the release lever 73 returns to a position upwardly away from the pressing portion 52 in a state where the release lever 73 is released from an operational force of the release cable 75 (i.e., in a state where the seat back 8 returns from the forward folding state).

The memory lever 80 includes a spring support piece 80a and a memory engagement piece 80b to be formed into an L-shape. The spring support piece 80a and the memory engagement piece 80b extend radially relative to the rotational center O3 to a front side and a lower side respectively. A holding spring 81 is disposed between the memory lever 80 and the power transmission lever 74. Specifically, one end of the holding spring 81 engages with the spring support piece 74a of the power transmission lever 74 while the other end of the holding spring 81 engages with the spring support piece 80a of the memory lever 80. The holding spring 81 includes an elastic coefficient sufficiently larger than that of the return spring 77. That is, the memory lever 80 is connected to the power transmission lever 74 via the holding spring 81 so as to substantially integrally rotate with the power transmission lever 74.

The memory lever 80 is contactable with a memory pin via the memory engagement piece 80b that extends towards the inner void S through the upper rail 4 (specifically, the cover wall portion 15 thereof). The memory pin is provided so as to store a position of the seat 5 (i.e., the memory pin performs a storage operation) immediately before the seat 5 moves in association with the forward folding of the seat back 8 of the seat 5. The memory lever 80 integrally rotates with the release lever 73 and the like in the aforementioned manner in association with the forward folding of the seat back 8 to thereby engage with the memory pin that then performs the storage operation.

An operation of the seat slide apparatus according to the present embodiment will be explained below. First, the operation handle 50 is operated so that the operating portion 51a is pulled up. Then, both the end portions 51b of the handle body portion 51 of the operation handle 50 rotate at the rotational axis O2 in a direction that corresponds to the counterclockwise direction in FIG. 2B. At this time, both the pressing portions 52 of the handle body portion 51 move downwardly, thereby pressing down the respective upper surfaces of the contact portions 21d of the lock levers 21. Then, the lock levers 21 rotate at the rotational axis O1 against a biasing force of the torsion wires 22 in a direction where the lock claws 21c disengage from the insertion bores 14a, and the like as illustrated in FIG. 3. Accordingly, the restriction of the relative movement between the lower rail 3 and the upper rail 4 at the first side and the restriction of the relative movement between the lower rail 3 and the upper rail 4 at the second side are released at the same time.

Afterwards, when the operation handle 50 is released (i.e., an operation force of the operating portion 51a is cancelled), the lock levers 21 rotate at the rotational axis O1 in a direction where the lock claws 21c engage with the insertion bores 14a, and the like as illustrated in FIG. 3. Accordingly, the relative movement between the lower rail 3 and the upper rail 4 at the first side and the relative movement between the lower rail 3 and the upper rail 4 at the second side are restricted at the same time. At this time, the end portions 51b of the operation handle 50 rotate at the operational axis O2 in a direction that corresponds to the clockwise direction in FIG. 2B in association with the rotations of both the lock levers 21.

Accordingly, because of the operation of the operation handle 50 and the release thereof afterwards, the position of the seat 5 is desirably adjusted relative to the floor 2 in the longitudinal direction of the seat 5. A seat slide mechanism is therefore achieved according to the present embodiment. On the other hand, in a case where the inner wire 75b is pulled within the external cable portion 75a of the release cable 75 in association with the forward folding of the seat back 8, the release lever 73 together with the power transmission lever 74 and the memory lever 80 rotate in the counterclockwise direction in FIG. 2B at the rotational center O3 against the biasing force of the return spring 77. At this time, the release lever 73 (specifically, the pressing piece 73b) directly presses the upper surface of one of the pressing portions 52 of the operation handle 50. Thus, one of the pressing portions 52 (i.e., the pressing portion 52 at the first side) that is pressed by the release lever 73 moves downward in a state where the end portion 51b rotates about the rotational axis O2 in the counterclockwise direction in FIG. 2B. The pressing portion 52 presses the upper surface of the contact portion 21d of the lock lever 21 at the first side.

The rotation of one of the end portions 51b (i.e., the end portion 51b at the first side) is transmitted via the operating portion 51a to the other of the end portions 51b (i.e., the end portion 51b at the second side). At this time, because the rigidity of the operation handle 50 is enhanced by the reinforcement portion 56, the operation handle 50 when rotating in association with the release lever 73, and the like is restrained from being deformed. Accordingly, the pressing portion 52 at the second side also moves downward to press the upper surface of the contact portion 21d of the lock lever 21 at the second side downwardly.

Accordingly, in association with the forward folding of the seat back 8, both the lock levers 21 rotate in the direction where the lock claws 21c disengage from the insertion bores 14a, and the like as illustrated in FIG. 3. Then, the restriction of the relative movement between the lower rail 3 and the upper rail 4 at the first side and the restriction of the relative movement between the lower rail 3 and the upper rail 4 at the second side are released. In a state where the seat back 8 is folded and positioned forward, the restriction of the relative movement between the lower rail 3 and the upper rail 4 at the first side and the restriction of the relative movement between the lower rail 3 and the upper rail 4 at the second side are released. Therefore, because of the forward folding of the seat back 8, the seat 5 may move to a foremost position relative to the floor 2 (which is a so-called walk-in mechanism).

In association with the forward folding of the seat back 8, the memory lever 80 rotates together with the release lever 73 and the like so that the memory pin that engages with the memory lever 80 performs the memory operation. Accordingly, in a case where the seat 5 that is moved to the foremost position relative to the floor 2 is then moved rearward while the seat 5 is being folded forward, the seat 5 returns to the position immediately before the forward folding of the seat back 8 that is stored during the memory operation by the memory pin.

According to the aforementioned embodiment, at a time of the forward folding of the seat back 8, the release lever 73 provided at the upper rail 4 at the first side directly presses the upper surface of the pressing portion 52 of the end portion 51b at the first side. Then, the end portion 51b at the second side also rotates to thereby release the restriction of the relative movement between the lower rails 3 and the upper rails 4 at the first and second sides by the respective lock levers 21. Therefore, the number of components for the seat slide apparatus may be reduced compared to a case where a connecting bar is provided so as to bring the lock levers 21 at the first and second sides to operate together or a case where the release levers are provided at both the upper rails 4.

According to a seat slide apparatus for a vehicle disclosed in JPH11-321393A, a control bar corresponding to the operation handle 50 and stoppers corresponding to the lock levers 21 of the present embodiment are connected to one another. Thus, the control bar and the stoppers apparently operate in association with one another. However, because a connection bar is provided to bring both the stoppers to operate together, it may be obvious that even when one of the stoppers operates, the other of the stoppers does not operate via the control bar.

According to the present embodiment, the rotational center O3 of the release lever 73 extends in the width direction of the seat 5 at an upper side of the end portion 51b. The rotational center O3 is arranged at the intermediate portion in the longitudinal direction of the seat 5 between the support bore 37 and the position where the release lever 73 presses the upper surface of the pressing portion 52. Therefore, in a case where the release lever 73 rotates in association with the forward folding of the seat back 8, the end portion 51b at the first side of which the upper surface is directly pressed by the release lever 73 rotates in such a manner to be pressed down relative to the support bore 37 provided at the upper rail 4 at the first side. At this time, when the release lever 73 rotates while pressing the pressing portion 52, the position where the pressing piece 73b of the release lever 73 presses the upper surface of the pressing portion 52 is displaced towards the support bore 37. Thus, even when the rotation amount of the release lever 73 increases until the restriction of the relative movement between the lower rail 3 and the upper rail 4 by the lock lever 21 is released, the release lever 73 stably presses the upper surface of the pressing portion 52.

In addition, according to the present embodiment, the operation handle 50 securely transmits the rotation of the end portion 51b at the first side to the end portion 51b at the second side by a rigidity increase of the reinforcement portion 56. Further, in a case where the end portions 51b are inserted into the respective support bores 37, the operation handle 50 is appropriately positioned because the fixing portions 56b of the reinforcement portion 56 make contact with the front end portions of the support bores 37 of the support wall portions 36 respectively. As a result, each of the end portions 51b is restrained from being excessively inserted into the support bore 37. Furthermore, each of the fixing portions 56b is fixed to each of the end portions 51b at a contact position with the front end portion of each of the support bores 37. The aforementioned contact position is the closest to a position where each of the pressing portions 52 of the end portion 51b presses the upper surface of each of the lock levers 21 within a range close to the operating portion 51a relative to the support bore 37 in the longitudinal direction of the seat 5 where an arrangement restriction may not be generally affected. Therefore, a deformation of the operation handle 50 that may be generated when the rotation of the end portion 51b at the first side is transmitted to the end portion 51b at the second side may be effectively restrained.

Further, according to the present embodiment, each of the pressing portions 52 is formed into a flat plate. Thus, the pressing piece 73*b* of the release lever 73 makes a line contact with the upper surface of the pressing portion 52. Thus, the release lever 73 stably presses the upper surface of the pressing portion 52.

Furthermore, according to the present embodiment, the pressing portions 52 of the operation handle 50 are prevented from being connected to the respective lock levers 21. Then, the upper surfaces of the lock levers 21 are pressed by the pressing portions 52 respectively. The occupant of the seat 5 generally fastens a seatbelt. Thus, in the event of a vehicle collision, a remarkably large moment is applied to the seat 5 via a buckle of the seatbelt fixed to the seat 5. In this case, positions or shapes of the lower rails 3 at the first side and the second side are unbalanced, which may cause an interference of one of the end portions 51*b* of the operation handle 50 with the floor 2. Then, the pressing portion 52 of one of the end portions 51*b* may rotate and press the upper surface of the lock lever 21. However, because the pressing portions 52 of the operation handle 50 are not connected to the respective lock levers 21, the possible rotation of the pressing portion 52 of one of the end portions 51*b* is absorbed by a movable range of the pressing portion 52 of the other of the end portions 51*b* relative to the upper surface of the lock lever 21.

The present embodiment may be modified as follows. The rotational center O3 of the release lever 73 may be arranged in a direction away from the support bore 37 relative to the position where the release lever 73 presses the upper surface of the pressing portion 52 in the longitudinal direction of the seat 5. In this case, when the release lever 73 rotates in association with the forward folding of the seat 5, one of the end portions 51*b* of which the upper surface of the pressing portion 52 is directly pressed by the release lever 73 (i.e., the end portion 51*b* at the first side) rotates so as to be pressed downward relative to the support bore 37. At this time, the position where the release lever 73 presses the upper surface of the pressing portion 52 is away from the support bore 37 in association with the increase of the rotation amount of the release lever 73. That is, a force required to press down the end portion 51*b* relative to the support bore 37 decreases in association with the increase of the rotation amount of the release lever 73. On the other hand, the biasing force of each of the torsion wires 22 increases in association with the release of the restriction of the relative movement between the lower rail 3 and the upper rail 4 by the lock lever 21, i.e., in association with the increase of the rotation amount of the release lever 73. Accordingly, while the biasing force of the torsion wire 22 is increasing in association with the increase of the rotation amount of the release lever 73, the force required to press down the end portion 51*b* of the operation handle 50 is decreasing. Consequently, for example, a fluctuation of load applied to the release lever 73 may be reduced as a whole.

Further, each of the support brackets 31 may rotatably support the operation handle 50 by a pin concentric to the rotational axis O2 instead of each of the support bores 37.

Furthermore, a portion of the operation handle 50 by which each of the lock levers 21 is pressed or a portion of the operation handle 50 that is pressed by the release lever 73 may not be limited to the edge portion (i.e., the pressing portion 52) of the operation handle 50. Any portion between a support portion and an end of the end portion 51*b* may be applicable.

Furthermore, a portion of each of the lock levers 21 where the end portion 51*b* of the operation handle 50 presses down may not be limited to the upper surface. An appropriate portion of the lock lever 21 that is brought to the unlocked state may be specified depending on the shape of the lock lever 21.

Furthermore, configurations or components related to the memory operation storing a position of the seat 5 in the longitudinal direction thereof at the time of the forward folding of the seat back 8, such as the power transmission lever 74, the power transmission pin 76, the return spring 77, the memory lever 80, the holding spring 81, and the like may be omitted.

Furthermore, the biasing member engaging with the lock lever 21 may be a plate spring, a coil spring, or the like instead of the torsion wire 22. The moving direction of the upper rail 4 relative to the lower rail 3 may correspond to the width direction of the vehicle.

According to the embodiment, in a case where an operation force is applied to the operating portion 51*a* of the operation handle 50 to thereby rotate the end portions 51*b* about the respective support bores 37, the end portions 51*b* press the lock levers 21. As a result, the restricted state of the movement of the upper rails 4 relative to the lower rails 3 is released against the biasing force of the torsion wires 22. Accordingly, the movement of the upper rails 4 relative to the lower rails 3, i.e., the movement of the seat 5 is permitted. In addition, in a case where the release lever 73 rotates in association with the forward folding of the seat back 8 of the seat 5, the end portion 51*b* at the first side that is directly pressed by the release lever 73 rotates about the support bore 37. On the other hand, in a case where the end portion 51*b* at the first side rotates, the aforementioned rotation is transmitted to the end portion 51*b* at the second side via the operating portion 51*a* of the operation handle 50. Then, the end portion 51*b* at the second side rotates about the support bore 37. The end portions 51*b* rotate to press the respective lock levers 21, and therefore the restriction of the movement of the upper rails 4 relative to the lower rails 3 by the lock levers 21 is released against the biasing force of the torsion wires 22. In association with the forward folding of the seat back 8, the movement of the upper rails 4 relative to the lower rails 3, i.e., the movement of the seat 5 is permitted. Accordingly, the release lever 73 provided at the upper rail 4 directly presses the end portion 51*b* at the first side, which leads to the rotation of the end portion 51*b* at the second side so as to release the restricted state of the movement between the upper rail 4 and the lower rail 3 by the lock lever 21 at the second side. As a result, the number of components for the seat slide apparatus according to the present embodiment may be reduced as compared to a case where a connecting rod is provided to bring the lock levers 21 to operate together, a case where both the upper rails 4 are equipped with the release levers 73, and the like.

According to the aforementioned embodiment, the support portions include the support bores 37 opening in the longitudinal direction. The operation handle 50 releases the restriction of the movement of the upper rails 4 relative to the lower rails 3 by the lock levers 21 by the pressing portions 52 of the end portions 51*b* pressing the upper surfaces of the lock levers 21 in association with the rotations of the end portions 51*b* relative to the support bores 37. The end portions 51*b* are inserted into the support bores 37 respectively. The release lever 73 rotates in association with the forward folding of the seat back 8 of the seat 5 so as to directly press the upper surface of the pressing portion 52 of the end portion 51*b* at the first side.

Further, according to the aforementioned embodiment, the rotational center O3 of the release lever 73 extends in the width direction of the seat 5 at the upper side of the end portion 51*b* at the first side. The rotational center O3 is arranged at the intermediate position in the longitudinal direction of the seat 5 between the support bore 37 and the position where the release lever 73 presses the end portion 51*b* at the first side.

Accordingly, in a case where the release lever 73 rotates in association with the forward folding of the seat back 8, the end portion 51*b* at the first side directly pressed by the release lever 73 rotates so as to be pressed down relative to the support bore 37. At this time, when the release lever 73 rotates while pressing the end portion 51*b*, the position where the release lever 73 presses down the end portion 51*b* is displaced towards the support bore 37. Thus, even when the release lever 73 further rotates until the restriction of the relative movement between the upper rails 4 and the lower rails 3 is released, the end portion 51*b* at the first side is stably pressed by the release lever 73.

Furthermore, according to the aforementioned embodiment, the rotational center O3 of the release lever 73 extends in the width direction of the seat 5 at the upper side of the end portion 51*b* at the first side. The rotational center O3 is arranged at a side away from the support bore 37 relative to the position where the release lever 73 presses the end portion 51*b* at the first side.

Accordingly, in a case where the release lever 73 rotates in association with the forward folding of the seat back 8, the end portion 51*b* at the first side directly pressed by the release lever 73 rotates so as to be pressed down relative to the support bore 37 at the first side. At this time, the position where the release lever 73 presses the end portion 51*b* is away from the support bore 37 at the first side in association with the increase of the rotation amount of the release lever 73. That is, a force required to press down the end portion 51*b* (the operation handle 50) relative to the support bore 37 decreases in association with the increase of the rotation amount of the release lever 73. On the other hand, the biasing force of each of the torsion wires 22 increases in association with the release of the restriction of the relative movement between the lower rail 3 and the upper rail 4 by the lock lever 21, i.e., in association with the increase of the rotation amount of the release lever 73. Accordingly, while the biasing force of the torsion wire 22 is increasing in association with the increase of the rotation amount of the release lever 73, the fore required to press down the end portion 51*b* of the operation handle 50 is decreasing. Consequently, for example, a fluctuation of load applied to the release lever 73 may be reduced as a whole.

Furthermore, according to the aforementioned embodiment, the operation handle 50 includes the reinforcement portion 56 restraining a deformation of the operation handle 50 in a case where a rotation of the end portion 51*b* at the first side is transmitted to the end portion 51*b* at the second side.

Accordingly, the operation handle 50 securely transmits the rotation of the end portion 51*b* at the first side to the end portion 51*b* at the second side by a rigidity increase of the reinforcement portion 56.

Furthermore, according to the aforementioned embodiment, the support bores 37 are arranged at the inner side in the width direction of the seat 5 relative to the upper rails 4 respectively, and the reinforcement portion 56 integrally includes the connecting portion 56*a* that extends in the width direction, and the fixing portions 56*b* that extend from both ends of the connecting portion 56 in the longitudinal direction of the seat 5 to be fixed to the inner side surfaces of the end portions 51*b* in the width direction respectively. The fixing portions 56*b* make contact with the front end portions of the support bores 37 facing the operating portion 51*a*.

The operation handle 50 is positioned by the contact between the fixing portions 56*b* of the reinforcement portion 56 and the front end portions of the support bores 37 in a case where the end portions 51*b* are supported by the respective support bores 37. Specifically, the end portions 51*b* are restrained from being excessively inserted into the respective support bores 37. In addition, even in a case where the occupant of the seat 5 presses the operation handle 50 by his/her heel by accident in the event of a vehicle collision, for example, the end portions 51*b* are restrained from being excessively inserted into the support bores 37. Further, each of the fixing portions 56*b* is fixed to each of the end portions 51*b* at a contact position with the front end portion of each of the support bores 37. The aforementioned contact position is the closest to a position where each of the pressing portions 52 of the end portion 51*b* presses the upper surface of each of the lock levers 21 within a range close to the operating portion 51*a* relative to the support bore 37 in the longitudinal direction of the seat 5 where an arrangement restriction may not be affected. Therefore, a deformation of the operation handle 50 that may be generated when the rotation of the end portion 51*b* at the first side is transmitted to the end portion 51*b* at the second side may be effectively restrained.

Furthermore, according to the aforementioned embodiment, the release lever 73 includes the first extending portion 73*a* extending radially relative to the rotational center O3 to a rear side and the pressing piece 73*b* extending inwardly in the width direction of the seat 5 from a lower rear edge of the first extending portion 73*a*. The pressing piece 73*b* is arranged at an upper side of the pressing portion 52 of the end portion 51*b* at the first side while being positioned on a rotation locus relative to the rotational center O3.

Furthermore, according to the aforementioned embodiment, the release lever 73 includes the second extending portion 73*c* extending radially relative to the rotational center O3 to a front upper side and the engagement bore 73*d* formed at a front end of the second extending portion 73*c*, the engagement bore 73*d* with which the release cable 75 connected to the seat back 8 engages.

Furthermore, according to the aforementioned embodiment, the seat slide apparatus further includes the supporting brackets 29 tightened to the upper surfaces of the upper rails 4 respectively, each of the supporting brackets 29 extending upwardly at the inner side in the width direction of the seat 5, and the auxiliary bracket 71 tightened to the intermediate portion of the supporting bracket 29 at the first side in the longitudinal direction. The auxiliary bracket 71 includes the cable support portion 71*a* extending inwardly in the width direction of the seat 5 from a rear edge of the auxiliary bracket 71 and the spring support portion 71*b* extending inwardly in the width direction of the seat 5 from a front edge of the auxiliary bracket 71. The release cable 75 includes the external cable portion 75*a* held by the cable support portion 71*a* and the inner wire 75*b* pulled out from the external cable portion 75*a* and engaging with the engagement bore 73*d* formed at the second extending portion 73*c* of the release lever 73. The inner wire 75*b* is pulled within the external cable portion 75*a* in association with the forward folding of the seat back 8.

Furthermore, according to the aforementioned embodiment, the fixing portions 56*b* are fixed to the end portions 51*b* at the contact positions relative to the front end portions of the support bores 37 respectively, each of the contact positions being the closest to the position where each of the pressing portions 52 of the end portion 51*b* presses the upper surface of each of the lock levers 21 within the range close to the operating portion 51*a* relative to the support bore 37 in the longitudinal direction of the seat 5.

Furthermore, according to the aforementioned embodiment, the operation handle 50 includes the reinforcement portion 56 restraining a deformation of the operation handle 50 in a case where a rotation of the end portion 51b at the first side is transmitted to the end portion 51b at the second side. The support bores 37 are arranged at an inner side in the width direction of the seat 5 relative to the upper rails 4 respectively. The reinforcement portion 56 integrally includes the connecting portion 56a that extends in the width direction, and fixing portions 56b that extend from both ends of the connecting portion 56a in the longitudinal direction of the seat 5 to be fixed to inner side surfaces of the end portions 51b in the width direction respectively. The fixing portions 56b make contact with the front end portions of the support bores 37 facing the operating portion 51a.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle, comprising:
   first and second lower rails arranged at both sides in a width direction of a seat and extending in a longitudinal direction of the seat;
   first and second upper rails fixed to the seat and movably connected to the first and second lower rails respectively in the longitudinal direction;
   first and second lock levers rotatably connected to the first and second upper rails respectively, the first and second lock levers engaging with the first and second lower rails respectively to selectively restrict a movement of the first and second upper rails relative to the first and second lower rails;
   first and second biasing members biasing the first and second lock levers respectively in such a manner that the movement of the first and second upper rails relative to the first and second lower rails is restricted;
   first and second support brackets fixed to the first and second upper rails and including first and second support portions respectively;
   an operation handle integrally including an operating portion that extends in the width direction and first and second power transmission portions extending in the longitudinal direction from both ends of the operating portion to be supported by the first and second support portions, the first and second power transmission portions pressing the first and second lock levers respectively in association with rotations of the first and second power transmission portions relative to the first and second support portions so as to release a restriction of the movement of the first and second upper rails relative to the first and second lower rails by the first and second lock levers against a biasing force of the first and second biasing members; and
   a release lever rotatably connected to the first upper rail and rotating in association with a forward folding of a seat back of the seat so as to release the restriction of the movement of the first and second upper rails relative to the first and second lower rails by the first and second lock levers by directly pressing the first power transmission portion,
   wherein a rotational center of the release lever extends in the width direction of the seat at an upper side of the first power transmission portion, the rotational center being arranged at an intermediate position in the longitudinal direction of the seat between the first support portion and a position where the release lever presses the first power transmission portion,
   wherein the release lever includes a first extending portion extending radially relative to the rotational center to a rear side and a pressing piece extending inwardly in the width direction of the seat from a lower rear edge of the first extending portion, the pressing piece being arranged at an upper side of the edge portion of the first power transmission portion while being positioned on a rotation locus relative to the rotational center, and
   wherein the release lever includes a second extending portion extending radially relative to the rotational center to a front upper side and an engagement bore formed at a front end of the second extending portion, the engagement bore with which a release cable connected to the seat back engages.

2. A seat slide apparatus for a vehicle, comprising:
   first and second lower rails arranged at both sides in a width direction of a seat and extending in a longitudinal direction of the seat;
   first and second upper rails fixed to the seat and movably connected to the first and second lower rails respectively in the longitudinal direction;
   first and second lock levers rotatably connected to the first and second upper rails respectively, the first and second lock levers engaging with the first and second lower rails respectively to selectively restrict a movement of the first and second upper rails relative to the first and second lower rails;
   first and second biasing members biasing the first and second lock levers respectively in such a manner that the movement of the first and second upper rails relative to the first and second lower rails is restricted;
   first and second support brackets fixed to the first and second upper rails and including first and second support portions respectively;
   an operation handle integrally including an operating portion that extends in the width direction and first and second power transmission portions extending in the longitudinal direction from both ends of the operating portion to be supported by the first and second support portions, the first and second power transmission portions pressing the first and second lock levers respectively in association with rotations of the first and second power transmission portions relative to the first and second support portions so as to release a restriction of the movement of the first and second upper rails relative to the first and second lower rails by the first and second lock levers against a biasing force of the first and second biasing members;
   a release lever rotatably connected to the first upper rail and rotating in association with a forward folding of a seat back of the seat so as to release the restriction of the movement of the first and second upper rails relative to the first and second lower rails by the first and second lock levers by directly pressing the first power transmission portion;
   first and second supporting brackets tightened to upper surfaces of the first and second upper rails respectively, each of the supporting brackets extending upwardly at the inner side in the width direction of the seat; and an auxiliary bracket tightened to an intermediate portion of the first supporting bracket in the longitudinal direction, the auxiliary bracket including a cable support portion extending inwardly in the width direction of the seat from a rear edge of the auxiliary bracket and a spring support portion extending inwardly in the width direction of the seat from a front edge of the auxiliary bracket, wherein a rotational center of the release lever extends in the width direction of the seat at an upper side of the first power transmission portion, the rotational center being arranged at an intermediate position in the longitudinal direction of the seat between the first support portion and a position where the release lever presses the first power transmission portion, wherein the release lever includes a first extending portion extending radially relative to the rotational center to a rear side and a pressing piece extending inwardly in the width direction of the seat from a lower rear edge of the first extending portion, the pressing piece being arranged at an upper side of the edge portion of the first power transmission portion while being positioned on a rotation locus relative to the rotational center, wherein the release lever includes a second extending portion extending radially relative to the rotational center to a front upper side and an engagement bore formed at a front end of the second extending portion, the engagement bore with which a release cable connected to the seat back engages, and wherein the release cable including an external cable portion held by the cable support portion and an inner wire pulled out from the external cable portion and engaging with the engagement bore formed at the second extending portion of the release lever, the inner wire being pulled within the external cable portion in association with the forward folding of the seat back.

3. A seat slide apparatus for a vehicle, comprising:

first and second lower rails arranged at both sides in a width direction of a seat and extending in a longitudinal direction of the seat;

first and second upper rails fixed to the seat and movably connected to the first and second lower rails respectively in the longitudinal direction;

first and second lock levers rotatably connected to the first and second upper rails respectively, the first and second lock levers engaging with the first and second lower rails respectively to selectively restrict a movement of the first and second upper rails relative to the first and second lower rails;

first and second biasing members biasing the first and second lock levers respectively in such a manner that the movement of the first and second upper rails relative to the first and second lower rails is restricted;

first and second support brackets fixed to the first and second upper rails and including first and second support portions respectively;

an operation handle integrally including an operating portion that extends in the width direction and first and second power transmission portions extending in the longitudinal direction from both ends of the operating portion to be supported by the first and second support portions, the first and second power transmission portions pressing the first and second lock levers respectively in association with rotations of the first and second power transmission portions relative to the first and second support portions so as to release a restriction of the movement of the first and second upper rails relative to the first and second lower rails by the first and second lock levers against a biasing force of the first and second biasing members;

a release lever rotatably connected to the first upper rail and rotating in association with a forward folding of a seat back of the seat so as to release the restriction of the movement of the first and second upper rails relative to the first and second lower rails by the first and second lock levers by directly pressing the first power transmission portion;

first and second supporting brackets tightened to upper surfaces of the first and second upper rails respectively, each of the supporting brackets extending upwardly at the inner side in the width direction of the seat; and an auxiliary bracket tightened to an intermediate portion of the first supporting bracket in the longitudinal direction, the auxiliary bracket including a cable support portion extending inwardly in the width direction of the seat from a rear edge of the auxiliary bracket and a spring support portion extending inwardly in the width direction of the seat from a front edge of the auxiliary bracket, wherein a rotational center of the release lever extends in the width direction of the seat at an upper side of the first power transmission portion, the rotational center being arranged at a side away from the first support portion relative to a position where the release lever presses the first power transmission portion, wherein the release lever includes a first extending portion extending radially relative to the rotational center to a rear side and a pressing piece extending inwardly in the width direction of the seat from a lower rear edge of the first extending portion, the pressing piece being arranged at an upper side of the edge portion of the first power transmission portion while being positioned on a rotation locus relative to the rotational center, wherein the release lever includes a second extending portion extending radially relative to the rotational center to a front upper side and an engagement bore formed at a front end of the second extending portion, the engagement bore with which a release cable connected to the seat back engages, and wherein the release cable including an external cable portion held by the cable support portion and an inner wire pulled out from the external cable portion and engaging with the engagement bore formed at the second extending portion of the release lever, the inner wire being pulled within the external cable portion in association with the forward folding of the seat back.

* * * * *